G. J. MARTEL.
TIRE PATCHING DEVICE.
APPLICATION FILED JULY 21, 1911.

1,048,189.

Patented Dec. 24, 1912.

2 SHEETS—SHEET 1.

Witnesses:
E. E. Weels.
A. A. Olson

Inventor:
Gustave J. Martel,
By Joshua R. H. Potts
his Attorney.

G. J. MARTEL.
TIRE PATCHING DEVICE.
APPLICATION FILED JULY 21, 1911.

1,048,189.

Patented Dec. 24, 1912.

2 SHEETS—SHEET 2.

Witnesses:
C. E. Wessels.
A. A. Olson.

Inventor:
Gustave J. Martel,
By Joshua R. H. Potts
his Attorney.

UNITED STATES PATENT OFFICE.

GUSTAVE J. MARTEL, OF CHICAGO, ILLINOIS.

TIRE-PATCHING DEVICE.

1,048,189. Specification of Letters Patent. Patented Dec. 24, 1912.

Application filed July 21, 1911. Serial No. 639,771.

*To all whom it may concern:*

Be it known that I, GUSTAVE J. MARTEL, a citizen of the United States, and a resident of the city of Chicago, county of Cook, and State of Illinois, have invented certain new and useful Improvements in Tire-Patching Devices, of which the following is a specification.

My invention relates to improvements in patching devices for pneumatic tires and has for its object the production of a device of this character which will be adapted to effectually serve as a tire reinforcing means and which may be readily and quickly arranged in operative position about a tire and secured in such position to the rim of the tire with great expedition, and which may as readily and quickly be detached when desired.

Other objects will appear hereinafter.

With these objects in view my invention consists in the combinations and arrangements of parts hereinafter described and claimed.

Figure 1:
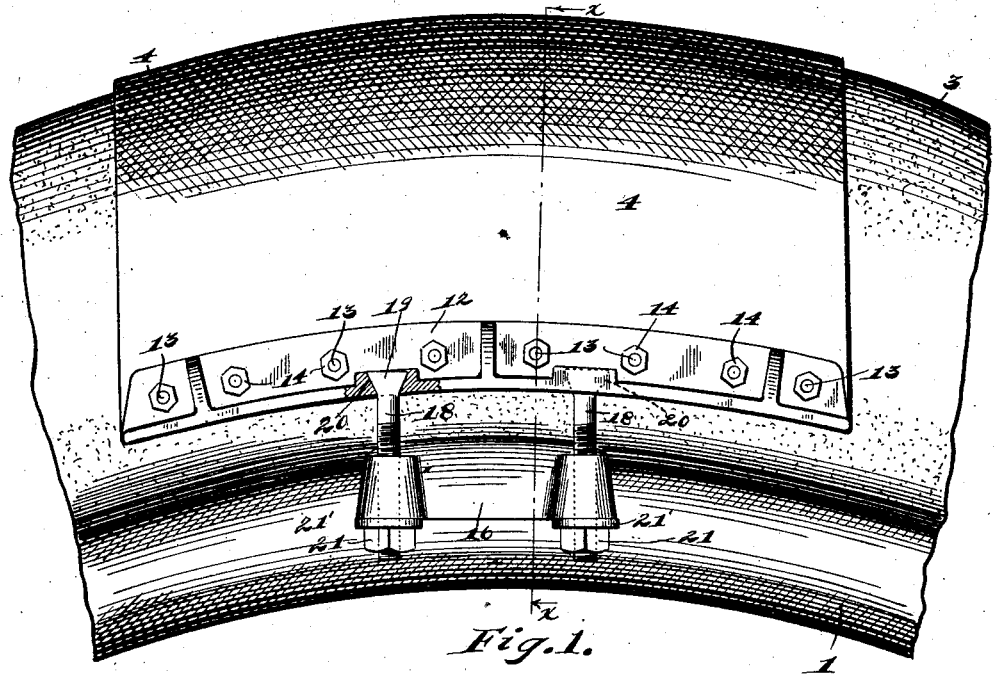
Figure 2:
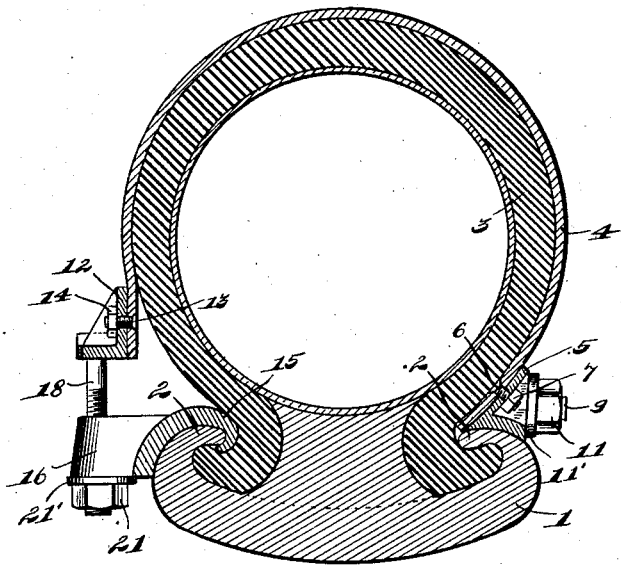
Figure 3:
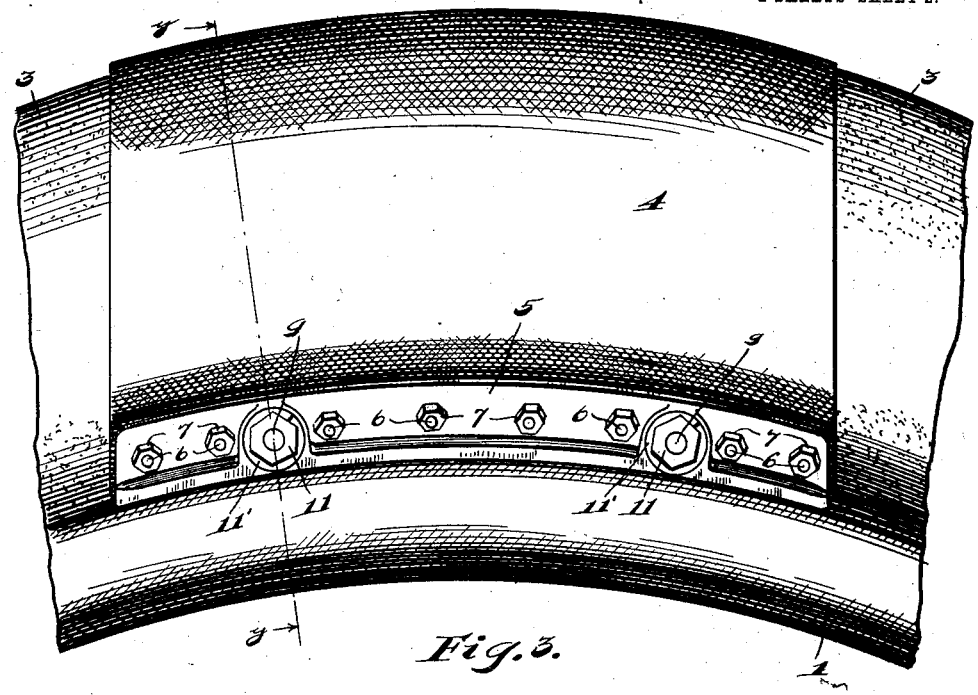
Figure 4:
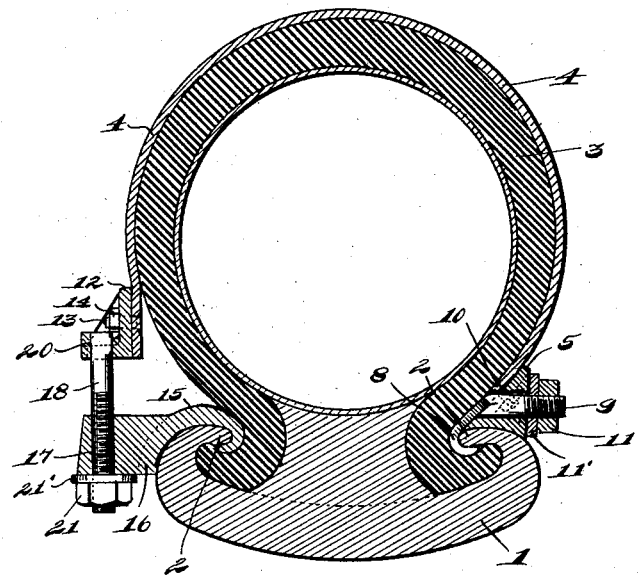

My invention will be best understood by reference to the accompanying drawings forming a part of this specification, and in which, Figure 1 is a side elevation of a section of an ordinary pneumatic tire and rim to which is applied a patching device embodying my invention; Fig. 2 is a transverse section taken on line $x$—$x$ of Fig. 1; Fig. 3 is a view similar to Fig. 1 of the opposite side of the construction shown in Fig. 1, and Fig. 4 is a transverse section taken on line $y$—$y$ of Fig. 3.

Referring now to the drawings 1 designates an ordinary clencher rim which is provided at its respective edges with the usual engaging or clencher flanges 2. Mounted in the rim 1 is a pneumatic tire of conventional construction, the same being held in position by means of the flanges 2 in the ordinary manner. Arranged about the tread portion of the tire 3 is the patching strap 4, the latter being formed of any suitable flexible and durable material, leather or rawhide being preferably used. The strap 4 is of any suitable width in order to best adapt the same to serve the purpose for which the same is designed, the same being of a length preferably less than the cross sectional circumference of the tread portion of the tire as clearly shown in Figs. 2 and 4.

Provided at one extremity of the strap 4 is a bar or yoke 5 of a length equal substantially to the width of said strap, said bar being secured rigidly to said strap by means of screws 6 and nuts 7. Said bar is bowed longitudinally as shown to conform with the peripheral curvature of the flange 2 of the rim 1, the underside of said bar being formed, as clearly shown in Figs. 2 and 4 to conform with the conformation of the periphery of the flange 2 against which the same is adapted to abut when the device is arranged in operative position. The bar 5 is secured in operative position to the rim 1 by means of hook members 8 the inner hooked ends of said members 8 being adapted to releasably embrace the adjacent flange 2 as shown in Fig. 4. The members 8 are formed with outwardly projecting shanks 9 which pass loosely through perforations 10 formed for the reception thereof in the bar 5. Nuts 11 threaded upon the outer ends of the shanks 9 serve obviously to maintain the bar 5 in snug engagement with the adjacent surfaces of the rim 1 and the tire 3, nut locks 11' of any approved design being preferably employed to prevent rotation of the nuts 11 when not desired. With this construction it will be observed that in order to release the extremity of the strap 4 it is only required to remove the nuts 11, since upon such removal bar 5 may be slid outwardly upon the shanks 9 to disengagement.

Arranged at the opposite extremity of the strap 4 is a bar or yoke 12 of a form corresponding substantially with the bar 5, the bar 12 being secured in position by means of screws 13 and nuts 14. Arranged at the opposite side of the rim 1 that is adjacent the bar 12 is a hook member 15 the inner hooked end of which releasably engages the adjacent engaging flange 2 of said rim. Formed upon the member 15 is an outwardly projecting portion 16 in which are formed two transversely extending perforations 17, said perforations being arranged substantially coplanar with the bar 12. The member 15 serves as a means of securing the last mentioned end of the strap 4, said member 15 being connected with the bar 12 through the medium of threaded studs 18 which depend from said bar passing through the perforations 17 in said member 15. The studs 18 are detachably connected with the bar 12, tapering heads 19 of said studs releasably engaging correspondingly formed sockets 20 provided for the reception thereof in said bar. Threaded upon the lower ends of the studs 18 are nuts 21 which serve obviously to connect said studs and the hook member 15, nut locks 21' being preferably employed in order to maintain the nuts 21 in position.

With the construction as set forth it will be seen that tightening of the strap 4 about the tire may be readily effected by positively rotating the nuts 21 upon the studs 18 and loosening of said strap in order to effect detachment thereof may be effected by reversely or negatively rotating said nuts upon said studs.

A tire patching device of the construction as set forth is durable and is of low cost to manufacture because of its economical construction. The device may be readily and quickly applied to a tire and is adapted when arranged in operative position to effectually serve to reinforce the tire at the place where the same is applied.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention what I claim as new and desire to secure by Letters Patent is:

1. In a tire patching device, the combination with a flanged rim and a tire mounted thereon, of a flexible patching strap extending over the tread portion of the tire; a bar secured to one extremity of said strap and adapted to rest upon the outer periphery of the rim flange; a hook member passing through said bar and engaging one of the rim flanges; and means for securing the other end of said strap to said rim, substantially as described.

2. In a tire patching device, the combination with a flanged rim and a tire mounted thereon, of a flexible patching strap extending over the tread portion of the tire; a bar secured to one extremity of said strap and adapted to rest upon the outer periphery of the rim flange; hook members having threaded shanks passing through said bar, said hook members engaging one of the rim flanges; nuts on said shanks; and adjustable means for securing the other end of said strap to said rim, substantially as described.

In testimony whereof I have signed my name to this specification in the presence of two subscribing witnesses.

GUSTAVE J. MARTEL.

Witnesses:
 HELEN F. LILLIS,
 JOSHUA R. H. POTTS.

---

Copies of this patent may be obtained for five cents each, by addressing the "Commissioner of Patents, Washington, D. C."